United States Patent

Diamond

[11] Patent Number: 5,997,935
[45] Date of Patent: Dec. 7, 1999

[54] CRISP FRIED IN GRAPESEED OIL

[76] Inventor: George B. Diamond, 62 Anthony Rd., Glen Gardner, N.J. 08826

[21] Appl. No.: 09/227,176

[22] Filed: Jan. 7, 1999

Related U.S. Application Data

[60] Provisional application No. 60/070,661, Jan. 7, 1998, and provisional application No. 60/093,448, Jul. 20, 1998.

[51] Int. Cl.⁶ .................................................. A21D 13/04
[52] U.S. Cl. ........................ 426/550; 426/439; 426/560; 426/634
[58] Field of Search ..................... 426/550, 559, 426/560, 446, 438, 439, 629, 634

[56] References Cited

U.S. PATENT DOCUMENTS

| | | | |
|---|---|---|---|
| 3,966,990 | 6/1976 | Cremer et al. | 426/550 |
| 4,212,892 | 7/1980 | Chahine et al. | 426/289 |
| 4,399,165 | 8/1983 | Tack et al. | 426/613 |
| 4,420,496 | 12/1983 | Hanson, Jr. et al. | 426/609 |
| 4,504,499 | 3/1985 | Finnan | 426/250 |
| 4,744,993 | 5/1988 | Bisson et al. | 426/38 |
| 5,158,795 | 10/1992 | Chen et al. | 426/312 |
| 5,387,431 | 2/1995 | Fuisz | 426/601 |
| 5,429,836 | 7/1995 | Fuisz | 424/195.1 |
| 5,484,594 | 1/1996 | Frangi et al. | 426/658 |
| 5,597,608 | 1/1997 | Fuisz | 426/658 |
| 5,612,074 | 3/1997 | Leach | 426/74 |
| 5,709,876 | 1/1998 | Fuisz | 424/439 |

*Primary Examiner*—Nina Bhat
*Attorney, Agent, or Firm*—Ostrolenk, Faber, Gerb & Soffen, LLP

[57] ABSTRACT

A fried crisp which includes a fried mixture of an edible product, such as, soy product, corn, potato or a mixture thereof, and an oil consisting essentially of grapeseed oil.

4 Claims, No Drawings

CRISP FRIED IN GRAPESEED OIL

RELATED APPLICATIONS

This application is based on Provisional Application Ser. No. 60/070,661, entitled "SOY BASED CRISP", filed Jan. 7, 1998 and Provisional Application Ser. No. 60/093,448, entitled "CRISP FRIED IN GRAPESEED OIL", filed Jul. 20, 1998.

BACKGROUND OF THE INVENTION

This invention relates to the manufacture of crisps fried in grapeseed oil.

The consumption of various snacks such as potato chips, corn chips, pretzels, nuts, extruded crisps and similar products is very high and growing annually at a rate of 2–5% per year in developed countries and at more than 20% per year in developing countries.

Exclusive of nuts, pretzels and some other foods, such snacks are generally known as crisps, namely those sliced from potatoes (with or without flavor additives) and those made from reconstituted vegetable matter, with starch and flavor additives, such as corn chips, reconstituted potato chips and soy base chips. These crisps are generally fried but chips are also available baked. The purpose of baking is to reduce or eliminate the fat that is added during frying. Certain fried crisps are now also available fried in a synthetic non-digestible fat. Fried chips contain from about 25% fat to more than 35%.

A baked low fat (under 10%) soy based crisp is described in our recently filed patent application.

Since the texture and flavor of baked crisps is different from fried crisps and the consumption of fried crisps by far exceeds that of baked crisps, this invention deals with fried crisps.

The use of synthetic fats and vegetable fats or vegetable/animal fats as opposed to butter and lard type fats and hydrogenated or partly hydrogenated fats is a dietary improvement, but none of these fats contain as much polyunsaturated fats as does grapeseed oil, and they do not contain bioflavinoids in appreciable quantities.

The following table shows the fatty acid content of various food oils and fats.

| Type of Oil | Essential Fatty Acid % (Poly-unsaturated) | Mono-unsaturated % | Saturated % |
| --- | --- | --- | --- |
| Grapeseed | 72 | 16 | 8 |
| Sunflower | 65 | 17 | 11 |
| Soybean | 60 | 24 | 14 |
| Peanut | 22 | 61 | 17 |
| Olive | 9 | 75 | 16 |
| Coconut | 2 | 6 | 87 |
| Cottonseed | 52 | 18 | 25 |

Grapeseed oil also contains proanthocyanidin (PCO), a natural bioflavonoid. PCO has an intense, free radical scavenging effect. Free radicals damage cells by causing mutations in DNA, premature aging, inflammation, weaken of the immune system and are implicated in more than 60 diseases. PCO is the most potent antioxidant ever discovered.

Two studies on grapeseed oil were conducted at SUNY Science Center in New York by Dr. David Nash. (D. T. Nash; Arteriosclerosis, An Official Journal of the American Heart Association, Inc., Vol. 10, No. 6, November–December 1990.) (D. T. Nash, Journal of the American College of Cardiology, 92T–116, 1993.) Both studies show that one ounce daily of grapeseed oil consumed for only several weeks showed that while total weight and cholesterol did not vary significantly, there was a significant drop in LDL (low density lipis—bad cholesterol) amounting to 7% and a rise in HDL (high density lipids—good cholesterol) of 13%, and the total cholesterol/HDL level was reduced by 15.6%.

The well known Helsinki heart study and the Framingham heart study (Drugs, 1990, 40 Suppl 1:138) showed that for every 1% increase in HDL, there was a 3% reduction in cardiac events like acute heart attack.

Soy protein's ability to lower cholesterol has been known for more than 30 years. In the 1970s, Cesare R. Sirtory and his colleagues narrowed the 30-year ongoing search to the legume's proteins and were able to lower the cholesterol of high cholesterol individuals by as much as 22%. Since then researchers have discovered a family of pigments, called isoflavones, as soy protein's most likely beneficial components. Chief among soy proteins are genistein and diadzein. Around 1990, genistein and its relatives were identified as potential anti-cancer agents; and the isoflavones are now identified as plant estrogens.

Recent work has also shown that these soy constituents are also antioxidants.

It is now evident that various components of soy act (a) to reduce cholesterol, (b) as antioxidants and cancer inhibitors, (c) as estrogen replacement in post menopausal women and (d) to help prevent stroke by limiting the buildup of atherosclerotic plaque in the carotid artery and (e) to improve the elasticity of arterial vessels in women, thus helping to prevent cardiovascular disease.

For significant benefits to be obtained from soy, about 20–40 gms. of soy protein per day needs to be consumed. But the consumption of soy from foods like tofu, soy candy bars, soy margarine and other soy containing foods, if such foods are eaten in normally consumed quantities, is not sufficient. And many of these foods contain certain fats, sugars and other ingredients which should be kept to a minimum.

An analysis of crisp consumption made by the Financial Mail on May 19, 1996, page 12, shows that in the USA, UK, Israel and Canada, the consumption of crisps is very high. In the USA, such consumption is 83×40 gm. bags per person per year. If extruded crisps are added, this total comes to over 100 such bags. This quantity is consumed in spite of crisps being considered a "junk food" and its consumption is minimized contrary to a desire to eat more of it.

If some other snacks are partly replaced by crisps, then as much as half to three quarters of the recommended daily soy intake could come from crisps.

Fried crisps unfortunately contain about 25% to more than 35% fat. Using 30% fat as an average, this results in some 12 gms. of fat per 40 gms. of crisps. This is too much fat intake unless benefits as opposed to detriments are derived from the fat.

SUMMARY OF THE INVENTION

It is an object of the invention to manufacture a product utilizing the beneficial effects of grapeseed oil.

It is also an object of the invention to manufacture a product which utilizes both the beneficial effects of grapeseed oil and the beneficial effects of soy protein.

These other objects are achieved by a crisp fried in grapeseed oil.

The crisp is preferably of a soybean based product, but it could also be an extruded product of corn or it could be an extruded or non-extruded (i.e., sliced) product of potato or a mixture of these products.

The content of non-grapeseed oil in the crisp is only that amount contained in the soy bean, corn and/or potato ingredients product.

DESCRIPTION OF PREFERRED EMBODIMENT(S)

All the ingredients except the grapeseed oil are blended together with added water in a mixing apparatus, such as is commonly used for such purposes, and then extruded and sliced into the desired size, shape and thickness.

The slices are then deep fried in the grapeseed oil; the frying temperature is adjusted between 340° F.–480° F. to control the time of frying and to control the amount of oil absorbed. Since grapeseed oil has the highest smoke point and flash point of all the oils suitable for commercial frying it is possible to control the amount of fat absorbed by increasing the frying temperature to just below the smoke point and maintain safety against ignition of the oil since its ignition temperature (open flash point) is 625° F. With a smoke point of 485° F. and an ignition (flash) point of 625° F. grapeseed oil is unique in allowing a very high temperature for frying.

Although grapeseed oil by its composition is the healthiest commercial fat available, nevertheless, the fat content of crisps and similar foods should be kept as low as possible. This is difficult to achieve if the frying temperature has to be kept relatively low.

The invention therefore allows the use of a desirable food oil for frying crisps and similar foods which are made from desirable ingredients, the combination being health enhancing while at the same time making it possible to control the total fat content over a wide range, considerably under that with other commercial frying oils.

Controlling the proportion of soy protein and grapeseed oil in a food product of a type which is consumed in large quantities is a major contribution in the manufacture of health enhancing food products. Further, the substitution of this product for such food products commonly known as "junk foods", i.e., crisps and similar products, which are now commonly consumed will also have a substantial health enhancing effect.

While as will be seen from the examples set out below, my invention of crisps fried in grapeseed oil can be made from several food products or extruded food products, the combination of grapeseed oil and soy products has the synergistic effective of supplying health enhancing nutrients, yet not including any nutrients deleterious to health.

The term "soy flour" as used herein includes high protein low fat soy flour also called Isolated Soy Protein Product. The term "soy product" as used herein includes high protein low fat soy flour and soybeans. The term "edible product" as used herein means the main ingredient of a crisp excluding grapeseed oil.

The following are examples of formulations using grapeseed oil and edible products. The percentages are percentages by weight.

| Example 1 | |
|---|---|
| Soy Flour | 35%–60% |
| Crushed Processed Soybeans | 12%–5% |
| Grapeseed Oil | 50%–25% |
| Starch | 1%–3% |
| Vegetable Gums | 1%–3% |
| Flavors and/or antioxidants | 1%–4% |
| Example 2 | |
| Soy Flour | 25%–50% |
| Potato Granules | 20%–10% |
| Grapeseed Oil | 50%–35% |
| Starch | 2%–3% |
| Vegetable Gum | 2%–1% |
| Flavors and/or antioxidants | 1%–1% |
| Example 3 | |
| Soy Flour | 10%–15% |
| Crushed Processed Soybeans | 40%–35% |
| Grapeseed Oil | 45%–37% |
| Starch | 2%–5% |
| Vegetable Gum | 2%–3% |
| Flavors and/or antioxidants | 1%–5% |
| Example 4 | |
| Soy Products | 50% |
| Other Vegetable Products | 15% |
| Grapeseed Oil | 30% |
| Starch | 3% |
| Vegetable Gum | 2% |
| Flavors and/or antioxidants | 1% |

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A fried crisp comprising:

a fried mixture of an edible soy product and an oil consisting essentially of grapeseed oil.

2. A fried crisp as in claim 1, wherein the percentage by weight of grapeseed oil is between 25% and 50%.

3. A method of making a fried crisp which comprises frying an edible soy product in an oil consisting essentially of grapeseed oil at a temperature between 340° F. and 480° F.

4. A method of making a fried crisp as in claim 3, wherein the percentage by weight of grapeseed oil is between 25% and 50%.

* * * * *